J. Gove,
Tanning Hides.

Nº 24,208.    Patented May 31, 1859.

Witnesses:
Joseph Tucker
Bainbridge Wadleigh

Inventor:
Jacob Gove

UNITED STATES PATENT OFFICE.

JACOB GOVE, OF MILFORD, NEW HAMPSHIRE.

TANNING LEATHER.

Specification of Letters Patent No. 24,208, dated May 31, 1859.

*To all whom it may concern:*

Be it known that I, JACOB GOVE, of Milford, in the State of New Hampshire, have invented an Improved Process of Tanning or Curing Hides; and I do hereby declare that the following is a full and exact description of its nature and operation, reference being had to the accompanying drawings, and to the letters of reference marked thereon, so as to enable others skilled in the art to use my invention.

Figure 1:
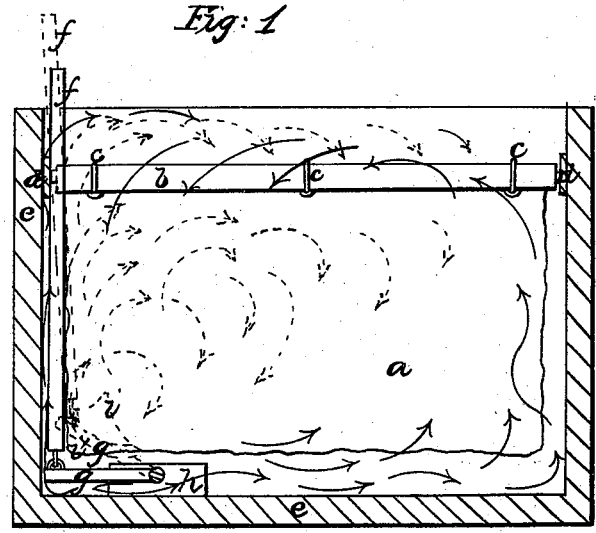
Figure 2:
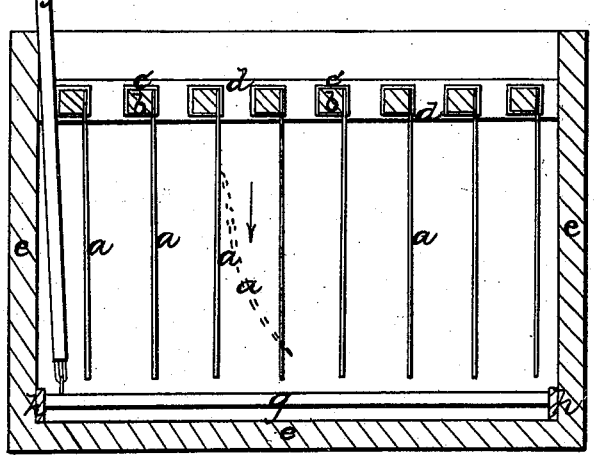

Figure 1, of the drawings represents a cross section, and Fig. 2, a longitudinal section through a vat containing hides.

$a, a, a$, represent the hides which are fastened to and suspended from crossbars $b, b, b$, by means of cords $c$, or any other suitable means; the cross bars $b$, are arranged in the tanning vat $e\ e\ e$, so that the bars and hides will be completely immersed when the vat has been filled with the tanning liquor.

The nature of my invention consists in giving the tanning liquor a rapid motion, commencing across the bottom of the vat and under the suspended hides, one device for effecting which is represented in the accompanying drawings where a stirring board $g$, is shown as being pivoted at $h, h$, near the bottom of the vat, and to which is attached a handle $f$, extending up above the surface of the liquid. By working this handle down and up, the stirring board will be vibrated on its pivots and thus keep the liquor in constant motion. While the board is being depressed the liquor will follow the direction indicated by the black arrows, and while the board is being elevated, the motion of the liquor will be such as indicated by red arrows, thus effectually stirring the portion of the liquor which is near the bottom of the vat, and causing it to rise and operate upon the hides. The motion of the liquor being from below upward has a tendency to swing the hides backward and forward, as indicated by dotted lines in Fig. 2. When the hides are thus inclined to one or the other side, the liquor moving downward as indicated by the arrow in Fig. 2, will operate effectually upon the sides of the hides and wash them thoroughly thus causing the tanning liquid to completely penetrate and saturate the hides. It will also be observed that a portion of the liquid is caused to rise up at the end of the vat, at each downward motion of the stirring board as indicated by part of the black arrows.

Having described my invention what I claim as new and desire to secure by Letters Patent in the process of tanning is—

Giving to the liquor or tanning fluid in the vat, a rapid motion commencing across the bottom of the vat and under the suspended hides, for the purpose set forth.

JACOB GOVE.

Witnesses:
JOSEPH TUCKER,
BAINBRIDGE WADLEIGH.